(12) United States Patent
Hsy et al.

(10) Patent No.: US 9,100,320 B2
(45) Date of Patent: Aug. 4, 2015

(54) MONITORING NETWORK PERFORMANCE REMOTELY

(75) Inventors: Joe Pei-Wen Hsy, Menlo Park, CA (US); Pierre Larose, St-Basile-le-Grand (CA)

(73) Assignee: BMC SOFTWARE, INC., Houston, TX (US)

(*) Notice: Subject to any disclaimer, the term of this patent is extended or adjusted under 35 U.S.C. 154(b) by 667 days.

(21) Appl. No.: 13/341,144

(22) Filed: Dec. 30, 2011

(65) Prior Publication Data

US 2013/0173778 A1    Jul. 4, 2013

(51) Int. Cl.
| G06F 15/173 | (2006.01) |
| G06F 15/16 | (2006.01) |
| H04L 12/26 | (2006.01) |
| H04L 29/06 | (2006.01) |

(52) U.S. Cl.
CPC ............ *H04L 43/14* (2013.01); *H04L 43/08* (2013.01); *H04L 63/306* (2013.01)

(58) Field of Classification Search
CPC ...................................... H04L 29/06
USPC .................... 709/224, 223, 225, 226, 227
See application file for complete search history.

(56) References Cited

U.S. PATENT DOCUMENTS

| 5,521,907 | A  | 5/1996 | Ennis, Jr. et al. |
| 5,781,449 | A  | 7/1998 | Rosborough |
| 5,870,557 | A  | 2/1999 | Bellovin et al. |
| 6,363,477 | B1 | 3/2002 | Fletcher et al. |
| 6,446,200 | B1 | 9/2002 | Ball et al. |
| 6,457,143 | B1 | 9/2002 | Yue |
| 6,801,940 | B1 | 10/2004 | Moran et al. |
| 7,506,368 | B1 | 3/2009 | Kersey et al. |
| 7,778,194 | B1 | 8/2010 | Yung |

(Continued)

FOREIGN PATENT DOCUMENTS

| WO | 03/038622 A1 | 5/2003 |
| WO | 03/084134 A1 | 10/2003 |
| WO | 2013/148472 A1 | 10/2013 |

OTHER PUBLICATIONS

Office Action for U.S. Appl. No. 13/174,464 dated May 23, 2013, 12 pages.

(Continued)

*Primary Examiner* — Noel Beharry
*Assistant Examiner* — Abdelnabi Musa
(74) *Attorney, Agent, or Firm* — Brake Hughes Bellermann LLP (57) ABSTRACT

According to one general aspect, a method may include establishing at least a first and a second network tap point near, in a network topology sense, an intranet/internet access point device and a server computing device, respectively. The method may include monitoring, via the first and second network tap points, at least partially encrypted network communication between a client computing device and the server computing device. A second network tap point analyzer device may decrypt at least a portion of the encrypted network communication that is viewed by the second tap point analyzer device. The method may include analyzing the monitored encrypted network communication to generate a set of metrics regarding the performance of the network communication between the client computing device and server computing device. In some embodiments a plurality of tap points and tap point analyzer devices corresponding to a multitude of network segments may be employed.

18 Claims, 5 Drawing Sheets

(56) References Cited

U.S. PATENT DOCUMENTS

| | | | |
|---|---|---|---|
| 7,953,973 B2 | 5/2011 | Beam et al. | |
| 7,962,606 B2 | 6/2011 | Barron et al. | |
| 8,005,011 B2* | 8/2011 | Yang | 370/253 |
| 8,023,419 B2 | 9/2011 | Oran | |
| 8,260,953 B2* | 9/2012 | Audenaert et al. | 709/235 |
| 8,266,276 B1* | 9/2012 | Vasudeva | 709/224 |
| 8,374,185 B2 | 2/2013 | Yang et al. | |
| 8,539,221 B2 | 9/2013 | Tremblay et al. | |
| 8,688,982 B2 | 4/2014 | Gagnon et al. | |
| 8,694,779 B2 | 4/2014 | Gagnon et al. | |
| 2002/0199098 A1 | 12/2002 | Davis | |
| 2003/0043844 A1 | 3/2003 | Heller | |
| 2004/0168050 A1 | 8/2004 | Desrochers et al. | |
| 2004/0221034 A1* | 11/2004 | Kausik et al. | 709/224 |
| 2005/0050316 A1 | 3/2005 | Peles | |
| 2005/0050362 A1* | 3/2005 | Peles | 713/201 |
| 2005/0149718 A1 | 7/2005 | Berlin | |
| 2006/0211416 A1* | 9/2006 | Snyder et al. | 455/423 |
| 2007/0028094 A1 | 2/2007 | Sugiyama | |
| 2007/0258468 A1 | 11/2007 | Bennett | |
| 2008/0279097 A1 | 11/2008 | Campion et al. | |
| 2010/0211675 A1 | 8/2010 | Ainali et al. | |
| 2011/0099620 A1 | 4/2011 | Stavrou et al. | |
| 2011/0119375 A1 | 5/2011 | Beeco et al. | |
| 2012/0042064 A1 | 2/2012 | Gagnon et al. | |
| 2012/0042164 A1 | 2/2012 | Gagnon et al. | |
| 2013/0262655 A1 | 10/2013 | Deschênes et al. | |

OTHER PUBLICATIONS

Office Action for U.S. Appl. No. 13/174,473 dated Jul. 11, 2013, 14 pages.
International Search Report and Written Opinion for International Application No. PCT/US2013/033361 dated Jun. 21, 2013, 14 pages.
Wei, Jianbin et al., "Measuring Client-Perceived Pageview Response Time of Internet Services", IEEE Transactions on Parallel and Distributed Systems, vol. 22, No. 5, May 2011, 15 pages.
Notice of Allowance received for U.S. Appl. No. 13/174,464, mailed on Nov. 13, 2013, 15 pages.
Notice of Allowance received for U.S. Appl. No. 13/174,473, mailed on Nov. 15, 2013, 12 pages.
Office Action received for European Patent Application No. 12199311.7, mailed on Apr. 4, 2013, 6 pages.
Response to Extended European Search Report for European Patent Application No. 12199311.7, filed on Jul. 29, 2013, 2 pages.
Non-Final Office Action for U.S. Appl. No. 13/432,847, mailed Apr. 6, 2015, 14 pages.

* cited by examiner

MONITORING NETWORK PERFORMANCE REMOTELY

TECHNICAL FIELD

This description relates to network performance, and more specifically to monitoring and analyzing the performance of communication between two network devices.

BACKGROUND

In a traditional software model, corporate information technology (IT) groups purchase software, deploy the software, and manage the software in its own data center. In such a model, the IT group is responsible for the performance and availability of the applications or purchased software. Traditionally, such IT groups use tools for monitoring the software applications in order to ensure consistent performance and availability.

Software as a service (SaaS), sometimes referred to as "on-demand software" or "Cloud software", is typically a software delivery model in which software and its associated data are hosted centrally (typically in the Internet or cloud) and are typically accessed by users from a computing device (e.g., desktop, laptop, netbook, tablet, smartphone, etc.) using a web browser over the Internet. SaaS has become a common delivery model for many business applications, including accounting, collaboration, customer relationship management (CRM), enterprise resource planning (ERP), invoicing, human resource management (HRM), content management (CM) and service desk management, etc. SaaS has been incorporated into the strategy of many leading enterprise software companies.

However, in the SaaS services model, in which the software is often provided as a service by a third party, end-user organizations frequently subscribe directly with a software provider. As such, an end-user generally directly contacts the SaaS provider to provide the software with a certain level of performance or availability.

However, often the end-users have neither the skills nor the economic resources to actively track such SaaS service levels. Nor would they generally have the tools to track such levels even if they wanted to. Frequently, there are no consistent service level agreements (SLAs) from a corporate perspective and even where there are SLAs, there are few tools to track performance let alone enforce service levels. As such, corporations frequently can no longer count on their IT groups to be responsible for the operations and management of mission critical applications. Often the IT group is reduced to merely supporting network and desktop access to SaaS providers, and not the performance of the SaaS applications themselves. Frequently, SaaS providers are now responsible for the application's performance and the corporate IT groups may not even have a direct relationship with the SaaS provider.

SUMMARY

According to one general aspect, a method may include establishing a first network tap point near, in a network topology sense, an intranet/internet access point device. The first network tap point may provide a substantially non-intrusive means of viewing network communication through the intranet/internet access point. The method may also include establishing a second network tap point near, in a network topology sense, a server computing device. The second network tap point may provide a substantially non-intrusive means of viewing network communication received or transmitted by the server computing device. The method may further include monitoring, via the first and second network tap points, at least partially encrypted network communication between a client computing device that is within an intranet and the server computing device that is external to the intranet. A second network tap point analyzer device may be configured to decrypt at least a portion of the at least partially encrypted network communication that is viewed by the second tap point analyzer device. The method may include analyzing the monitored at least partially encrypted network communication to generate at least one set of metrics regarding the performance of the network communication between the client computing device and server computing device.

According to another general aspect, a system may include a first and second network tap points and a client-side and server-side network tap point analyzer devices. The first network tap point may be configured to duplicate, in a non-intrusive manner, at least part of a network communication transmitted to and from an access point device that forms the boundary between a first network and a second network. The second network tap point may be configured to duplicate, in a non-intrusive manner, at least part of a network communication transmitted to and from a server computing device placed within, in a network topology sense, the second network. The client-side tap point analyzer device configured to monitor, via the first network tap point, at least partially encrypted network communication between a client computing device that is within the first network and the server computing device. The server-side tap point analyzer device may be configured to monitor, via the second network tap point, at least partially encrypted network communication between a client computing device and the server computing device, decrypt at least a portion of the monitored encrypted network communication, and analyze the monitored at least partially encrypted network communication to generate at least one set of metrics regarding the performance of the network communication between the client computing device and server computing device.

According to another general aspect, a computer program product for managing a network, the computer program product may exist. The computer program product may be tangibly embodied on a computer-readable medium and include executable code. The executable code, when executed, may be configured to cause an apparatus to monitor, via a first network tap point and a second network tap point, at least partially encrypted network communication between a client computing device that is within a first network and server computing device that is within a second network, wherein the second network tap point is configured to decrypt at least a portion of the at least partially encrypted network communication. The executable code may cause the apparatus to analyze the monitored at least partially encrypted network communication to generate at least one set of metrics regarding the performance of the network communication between the client computing device and server computing device.

The details of one or more implementations are set forth in the accompanying drawings and the description below. Other features will be apparent from the description and drawings, and from the claims.

A system and/or method for monitoring network performance, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
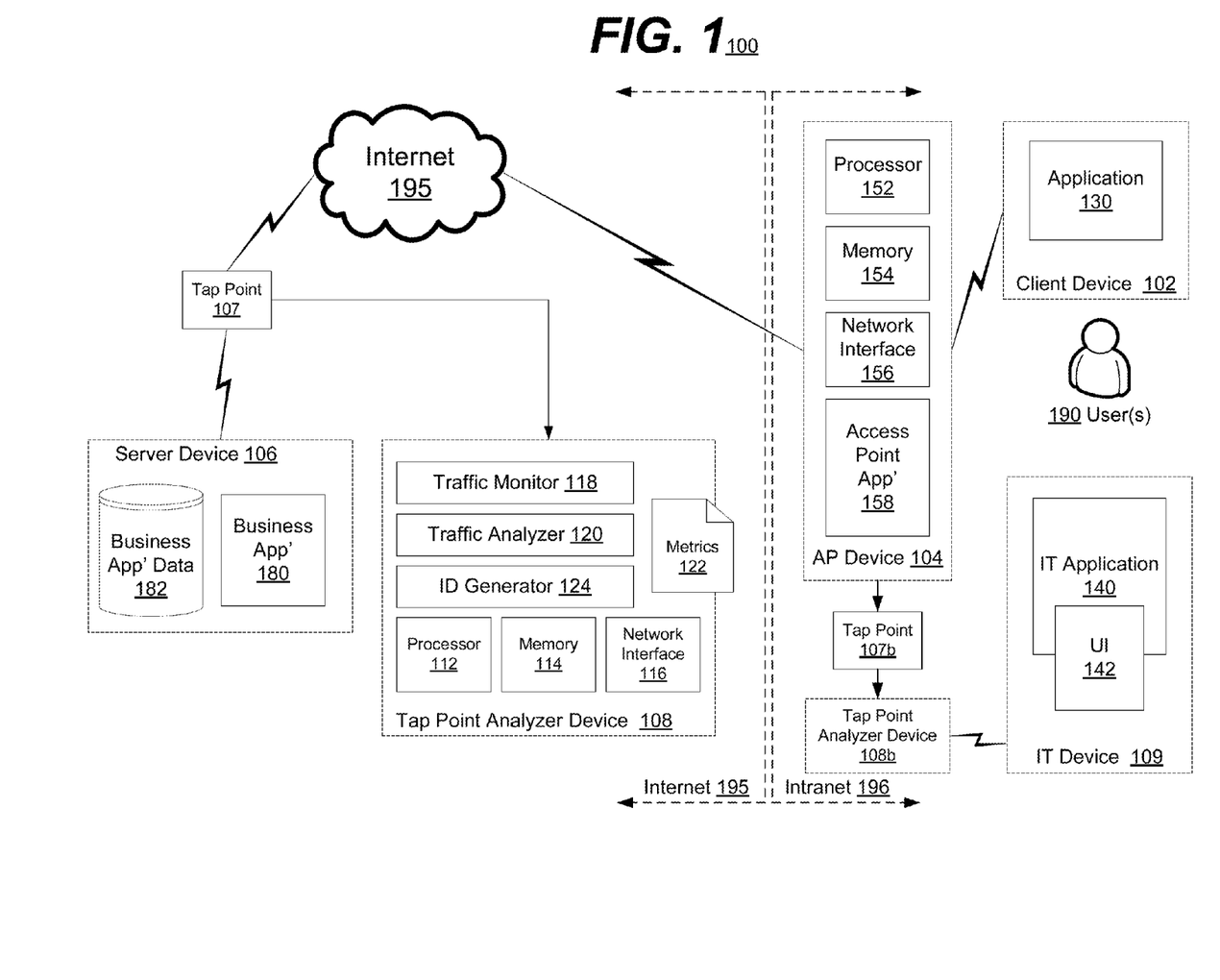
FIG. 1 is a block diagram of an example embodiment of a system in accordance with the disclosed subject matter.

FIG. 1 is a block diagram of an example embodiment of a system 100 in accordance with the disclosed subject matter. In various embodiments, the system 100 may include two or more communications networks. In the illustrated embodiment, the system 100 may include an intranet 196 and an internet 195. However, it is understood that the above is merely one illustrative example to which the disclosed subject matter is not limited. Further, it is understood that, while two networks or network segments 195 and 106 are illustrated, the disclosed subject matter is not limited to any number of such network or network segments.

In various embodiments, the system 100 may include a first communications network (e.g., intranet 196, etc.) that includes a client computing device 102. Typically, this first communications network 196 may be under the control of a single IT group or business unit. In various embodiments, the system 100 may include a second communications network (e.g., internet 195, etc.) that includes, at least from the point of view of the client computing device 102, the server computing device 106. Typically, this second communications network 195 may not be under the control of the IT group or business unit. It is understood that the above are merely a few illustrative examples to which the disclosed subject matter is not limited.

In various embodiments, the system 100 may include a server computing device or server 106 configured to provide a service (e.g., a web server, a SaaS application, etc.). In one embodiment, the server computing device 106 may include a processor, memory, and network interface (not shown, but analogous to those of device 104 or 108). In the illustrated embodiment, the server computing device 106 may provide and include the business application 180 and the business application data 182. In various embodiments, this business application 180 may include a SaaS application (e.g., a CRM, an ERP, a HRM, a CM, etc.). It is understood that, while one server 106 is illustrated, the disclosed subject matter is not limited to any number of such devices. Further, it is understood that the devices 102, 104, 106, 108, 108b, and 109 may include instantiations of such devices included in respective virtual or modular environments (e.g., a blade server system, virtual machines, etc.).

In various embodiments, the system 100 may include a client computing device or client 102 configured to consume or make use of the service (e.g., business application 180, SaaS application, etc.) provided by the server 108. In one embodiment, the client 102 may include a processor, memory, and network interface (not shown, but analogous to those of device 104 or 108). In various embodiments, the client 108 may include or execute an application 130 (e.g., a web browser, etc.) that accesses or displays the service or application 180 provided by the server 106. In some embodiments, the client 102 may be controlled or used by a user 190. In various embodiments, the client 102 may include a traditional computer (e.g., a desktop, laptop, netbook, etc.) or a non-traditional computing device (e.g., smartphone, tablet, thin client, computer terminal, etc.). It is understood that while only one client 102 is illustrated the disclosed subject matter is not limited to any particular number of client devices 102.

In various embodiments, the system 100 may include an access point (AP) device or intranet/internet AP device 104. In such an embodiment, the AP device 104 may be configured to separate the first and second networks (e.g., intranet 196 and internet 195, etc.). In various embodiments, the AP device,104 may include a router, a firewall, a proxy server, etc. or a combination thereof. It is understood that the above are merely a few illustrative examples to which the disclosed subject matter is not limited.

In various embodiments, the AP device 104 may include a processor 152 configured to execute a stream or machine executable instructions (e.g., operating system, application 158, etc.). The AP device 104 may include a memory 154 configured to store data and/or instructions. In various embodiments, the memory 154 may include volatile memory, non-volatile memory, or a combination thereof. The memory 154 or portions thereof may be configured to store data in a temporary fashion (e.g., Random Access Memory (RAM), etc.) as part of the execution of instructions by the processor 152. The memory 154 or portions thereof may be configured to store data in a semi-permanent or long-term fashion (e.g., a hard drive, solid-state memory, flash memory, optical storage, etc.).

In various embodiments, the AP device 104 may include one or more network interfaces 156 configured to communicate with other devices (e.g., server 104, client 102, etc.) via a communications network. In various embodiments, this communications network may employ wired (e.g., Ethernet, Fibre Channel, etc.) or wireless (e.g., Wi-Fi, cellular, etc.) protocols or standards or a combination thereof.

In one embodiment, the AP device 104 may include a device or AP application 158 that acts as an intermediary between the client 102 and the server 106. In the illustrated embodiment, which illustrates the AP device 104 as a proxy server, the client 102 may make a request to the AP device 104 to access the server 108 on behalf of the client 102. In such an embodiment, the AP device 104 may then forward (often repackaging or encapsulating) the communication from the client 102 to the server 106. Likewise, the server 106 may contact the AP device 104 with information or data that is to be forwarded to the client 102.

In such an embodiment, communication between the server 106 and the client 102 may take place in two parts. A client-side portion or part may occur between the client 102 and the AP device 104 via the intranet 196. A server-side portion may occur between the server 106 and the AP device 104 via the internet 195. In combination, these client and server side portions may constitute the communication between the two devices 102 and 106 across the two networks 195 and 196.

Often, one or both of these client-side and server-side portions may be encrypted. In such an embodiment, each of the respective encrypted portions of the network communication may include their respective encryption keys or security credentials.

For example, communication between the server 106 and the client 106 may be encrypted via the Hypertext Transfer Protocol (HTTP) Secure (HTTPS) protocol which makes use of the Secure Sockets Layer (SSL) and/or Transport Layer Security (TLS) protocols to provide encrypted communication and secure identification between two networked devices. It is understood that the above is merely one illustrative example to which the disclosed subject matter is not limited.

In the illustrated embodiment, an IT department or other entity may wish to monitor and analyze the network communication between the client 102 and the server 106. In order to do this, the IT department or other entity may place a network tap point 107 on a network (e.g., 196, etc.). In this context, a "network tap point" includes a substantially non-invasive means of viewing or monitoring network communication through the portion of the network where the network tap point 107 has been placed. In the illustrated embodiment, the network tap point 107 is placed such that any network communication transmitted or received by the server 106 is monitored or viewed.

However, placing a single network tap point 107 on the Internet 195 side of the AP device 104 may not be a preferred embodiment. In various embodiments, this may be because a single tap point close to the server (e.g., tap point 107, etc.) may not provide visibility as to which network segment of the potential multiple segments between 102 and 106 could be the bottleneck segment. It is understood that the above is merely one illustrative example to which the disclosed subject matter is not limited. In various embodiments, the more network segments there are the more tapping points may be desired.

For example, in the illustrated embodiment, a second tap point 107b may be placed such that any network communication traversing the AP Device 104 may be monitored or viewed. In various embodiments, additional tap points or a plurality of taps points may be added throughout the system. For example a third or fourth tap points (not shown) may be added at strategic or desirable points within the system to monitor or obtain performance metrics for additional network segments (e.g., between client 102 and AP device 104, etc.). In various embodiments, the tap point 107b and/or any additional tap points (not shown) may be similar or analogous to the tap point 107 described herein. Another embodiment is shown and discussed in reference to FIG. 2, as described below. It is understood that the above are merely an illustrative example to which the disclosed subject matter is not limited.

In various embodiments, the network tap point 107 may include a physical connection that splits or duplicates an incoming network signal and therefore any network communication transmitted via that network signal into two or more outgoing network signals. In such an embodiment, one of the outgoing network signals may be transmitted to its normal destination (e.g., AP device 104 or client device 102, etc.) and the second outgoing network signal may be transmitted to a tap, snooping, or listening device (e.g., tap point analyzer device 108, etc.). In such an embodiment, any delay added to the network communications signal may be minimal or substantially unnoticeable and the network signal may be unaltered or unprocessed. As such, the network tap point 107 may perform in a substantially non-intrusive manner.

In various embodiments, the network tap points 107 and 107b may be placed near, in a network topology sense, to the server device 106 or, respectively, the AP device 104 so as to capture or duplicate network communication passing between the server device 106 and the client device 102 through the AP device 104 or across the boundary between the two networks (e.g., an internet 195/intranet 196 boundary, etc.). In the illustrated embodiment, the network tap points 107 and 107b may provide a view of the server 106/client 102 network communication from a point of view both closer to the client 102 or the AP device 104 (tap point 107b) and the server 106 (tap point 107). It is understood that the above is merely one illustrative example to which the disclosed subject matter is not limited.

In one embodiment, the tap point analyzer device 108 may include a processor 112, memory 114, and network interface 116, analogous to those described above. As described above, in various embodiments, the memory 114 may include volatile storage (e.g., random access memory etc.), non-volatile storage (e.g., a hard drive, a solid-state drive, etc.), or, a combination thereof. In some embodiments, the tap point analyzer device 108 may include the network tap point 107.

In various embodiments, the tap point analyzer device 108 may be configured to monitor and analyze both encrypted and/or unencrypted network communication. In such an embodiment, the tap point analyzer device 108 may generate a set of metrics 122 regarding the performance of the network communication between the client 102 and the server 106. These metrics 122 may be transmitted or displayed within a user interface (UT) 142 of an IT application 140 that is executed by an IT computing device 109. In various embodiments, the IT computing device 109 may include a traditional computer (e.g., a desktop, laptop, netbook, etc.) or a non-traditional computing device (e.g., smartphone, tablet, thin client, computer terminal, etc.).

In the illustrated embodiment, the tap point analyzer device 108 may be configured to receive or monitor traffic captured by tap point 107 on the server-side. Conversely, tap point analyzer device 108b may be configured to receive or monitor traffic captured by tap point 107b on the client-side. In various embodiments, tap point analyzer device 108b may include elements and perform some or all functions similarly to tap point analyzer device 108, as described herein. In another embodiment, such as that discussed in reference to FIG. 2, the tap point analyzer devices 108 and 108b may perform similar but different functions or include different elements. It is understood that the above is merely one illustrative example to which the disclosed subject matter is not limited.

In one embodiment, the tap point analyzer device 108 may include a traffic monitor 118 configured to monitor network communication captured or duplicated by the network tap point 107. In various embodiments, this network communication may include encrypted network communication between the client 102 and the server 104. In the illustrated embodiment, the encrypted communication may include a portion of the client/server communication that occurs between the client 102 and the AP device 104. In a more preferred embodiment (e.g., the system 200 of FIG. 2), the tap point 107 may be placed to capture encrypted communication between the server 106 and the client device 102. It is understood that the above are merely a few illustrative examples to which the disclosed subject matter is not limited.

In some embodiments, as described below in reference to FIG. 2, the traffic monitor 118 may be configured to decrypt all or part of the network communication captured by one or more network tap points. In other embodiments, as described below in reference to FIG. 2, the tap point analyzer device 108 may be configured to decrypt all or part of the network communication captured by the network tap point 107 and may monitor and analyze such traffic. Conversely, tap point analyzer device 108b may not be configured to decrypt all or part of the network communication captured by the network tap point 107b, but may still monitor and analyze such traffic. In various embodiments, the tap point analyzer device 108b may be prevented from being able to decrypt the network communications because a private encryption key associated with the server device 106 (illustrated in FIGS. 2 and 4) remains within the server device for security reasons. In such an embodiment, the tap point analyzer device 108 can be configured to decrypt the network communication because it is within the domain (e.g., secure data center of the server device 106, etc.) and may be trusted with the private encryption key, whereas tap point analyzer device 108*b* (and other tapping points, as described below) are typically without or exterior to the domain (e.g., outside the secure data center, etc.) and do not have access to the private encryption key that is used to decrypt the network communication. This ability to at least partially decrypt encrypted network communication traffic is contrasted with traditional network communication monitorings schemes that generally discard or do not monitor encrypted network communication as the analyzer 120 or other portions of the tap point analyzer devices 108 and/or 108*b* are incapable of processing encrypted network communication.

In one embodiment, the tap point analyzer device 108 may include a traffic analyzer 120 configured to analyze the monitored network communication and generate the set of metrics 122. In various embodiments, the set of metrics 122 may include information, such as, the latency added by the intranet 196 or the AP device 104, the performance of various servers 106, the availability of the server 106, the number of accesses or web pages requested from/provided by server 106, the number of errors, retransmissions, or otherwise failed network communication interactions (e.g., web page views, etc.) between the client device(s) 102 and the server 106, an overall quality value of the network communication (e.g., a synthetic or aggregated measurement of latency and errors, etc.), the bandwidth usage involving the server 104 or client 102, a determination of where in the network (e.g., the server 106, the AP device 104, the client 102, etc.) any errors occur, the number of times the server 106 is accessed (e.g., page views, etc.) in a given time period, the number of client devices 102 accessing the server 106 at any given time or time period, performance metrics by each of a plurality of servers 106 or intranets 196, etc. In various embodiments, these metrics may be compiled for the overall client/server communication, communications involving just one of the networks (e.g., server-to-AP device, client-to-AP device, etc.), or a combination thereof. It is understood that the above are merely a few illustrative examples to which the disclosed subject matter is not limited.

As described below, in various embodiments, the traffic analyzer 120 may be configured to match or correlate network communication from one side (e.g., client-side) of the internet 195/intranet 196 boundary with network communication from the other side (e.g., server-side) of the internet 195/intranet 196 boundary. As described below, this may include matching network communication from two tap points 107 and 107*b* (or additional tap points depending upon the embodiment) based upon a predetermined set of criteria. In various embodiments, the monitored or captured network communication from one side (e.g., the server-side) may be encrypted and the tap point analyzer device 108 may not be able to decrypt that portion of the monitored network communication. In such an embodiment, the traffic analyzer 120 may still be configured to match or correlate, as best it can, the two portions (e.g., server-side and client-side) of the network communication.

In various embodiments, the tap point analyzer device 108 may include an Identifier (ID) Generator 124 configured to reduce or distill a portion of the monitored network communication into a substantially unique identifier. In various embodiments, the substantially unique identifier may be generated based, at least in part upon, unencrypted information available within the monitored network communications. Examples, in various embodiments, of such information may include: the source and/or destination network address or addresses (e.g., internet protocol OP) address), the source and/or destination port address or addresses, the Transmission Control Protocol (TCP) sequence number of the packets include by the monitored network communications, the number of bytes of the network communications as a whole or just the payload portions, etc. In various embodiments, this information may be unencrypted even if the payload portion (versus a header portion) of the monitored network communication.

In some embodiments, both tap point analyzer devices 108 and 108*b* may be configured to generate substantially unique IDs for various portions of the network communication that are monitored by the particular tap point analyzer device. In such an embodiment, a particular tap point analyzer device (tap point analyzer device 108*b*) may not be able to decrypt the encrypted network communication, and, therefore, may not be capable of generating as detailed metrics 122 as are desired. In such an embodiment, the particular tap point analyzer device (e.g., tap point analyzer device 108*b*) may be configured to transmit these substantially unique IDs to the second or another tap point analyzer device (e.g., tap point analyzer device 108).

As described below in reference to FIG. 2, the second or receiving tap point analyzer device (e.g., tap point analyzer device 108) may be configured to decrypt the encrypted network communications it monitors. In such an embodiment, it or at least its traffic analyzer 120 may be configured to match or associate the received substantially unique IDs with the decrypted network communications it monitors. In such an embodiment, by combining the information provided by the received substantially unique IDs and the locally monitored network communications a more complete set of metrics 122 may be generated.

Conversely, in one embodiment, the other tap point analyzer device 108 may be able to decrypt the encrypted network communication, and, therefore, may be capable of generating as detailed metrics 122 as are desired. However, as a single tap point analyzer device the decrypt-capable tap point analyzer device 108 may not be provide a holistic (vs. atomistic or one-sided) set of metrics. In such an embodiment, the decrypt-capable tap point analyzer device 108 may generate substantially unique IDs based upon the decrypted network communications. These decrypt-based substantially unique IDs may then be compared to the encrypted-based substantially unique IDs generated by the decrypt-incapable tap point analyzer device 108*b*, as described below.

In yet another embodiment, once the various monitored data objects from the two sides of the network communications are matched with one another, their various metric values may be matched or summed to provide a more complete metric that takes into account the entire network communication not just the portion or side from which the respective data objects where monitored.

For example, a single data object or communication transaction may include a web page view having a request, fulfillment, and acknowledgment phases. That web page view communication may include two portions: a client-side portion between the client 102 and the AP device 104, and a server-side portion between the server 106 and the AP device 104. Both the client-side portion and the server-side portion may have their own respective performance metrics (e.g., latency, etc.). Because the web page view communication is split into two parts (client-side and server-side) it may not be possible to directly measure the, for example, latency or time from the start to the finish of the web page view communication as measured from the client 102 to the server 106. However, if the two sides or portions of the communication are matched, the client/server latency may be determined based upon the client/AP device latency (client-side latency) and the AP device/server latency (server-side latency), both of which may be measured directly. It is understood that the above is merely one illustrative example to which the disclosed subject matter is not limited.

Figure 2:
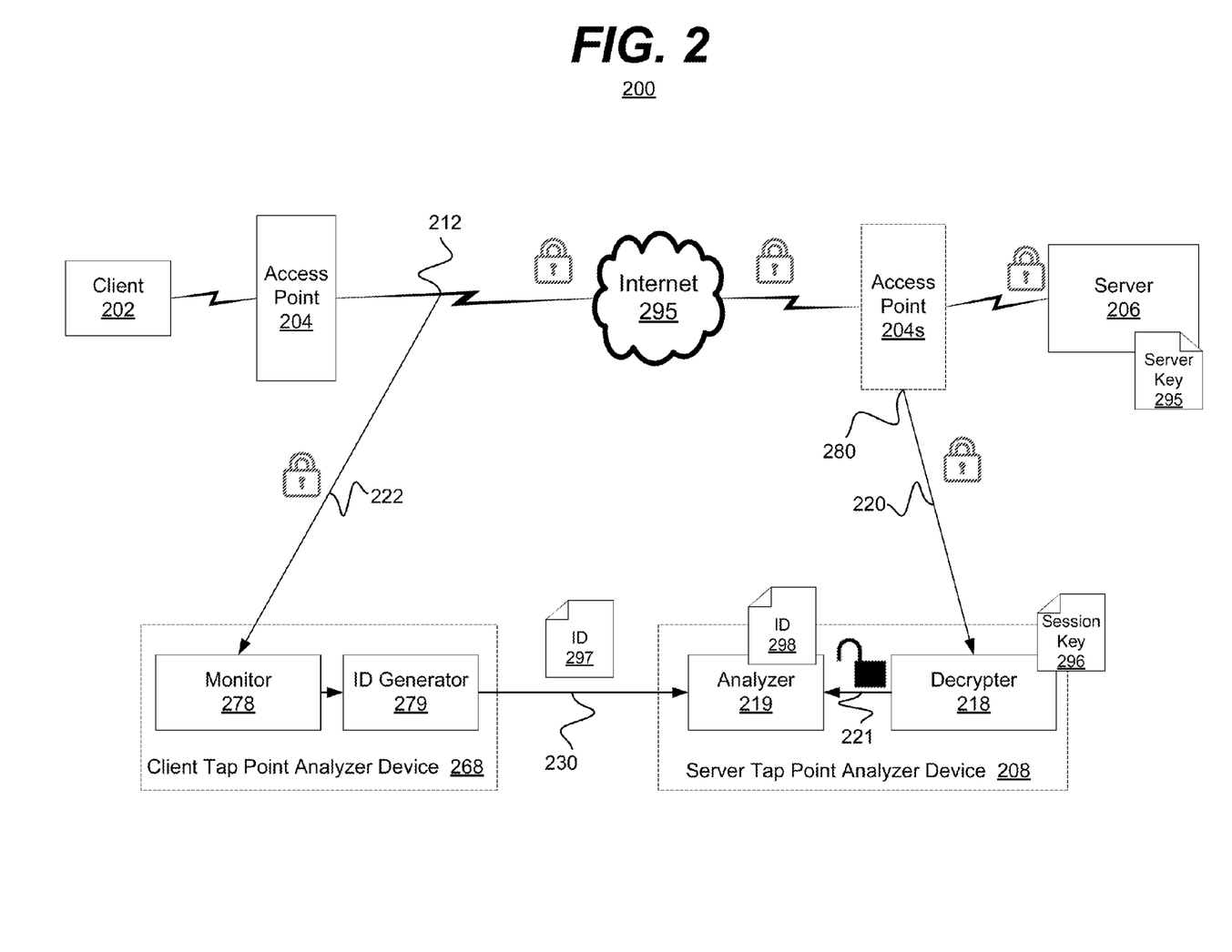
FIG. 2 is a block diagram of an example embodiment of a system in accordance with the disclosed subject matter.

FIG. 2 is a block diagram of an example embodiment of a system 200 in accordance with the disclosed subject matter. In various embodiments, the system 200 may include a client 202, a client-side AP device 204, an internet or second network 295, and a server 206 which is accessed across or via the second network 295. In various embodiments, the system 200 may include a server-side AP device 204s. The illustrated system 200 shows an embodiment in which the AP device 204 (AP device 204s) may not be a proxy but simply a router or other device. It is understood that the above is merely one illustrative example to which the disclosed subject matter is not limited.

In such an embodiment, a client-side tap point 212 may be placed near to, in a network topology sense, the server-side of the AP device 204. Likewise, in the illustrated embodiment, a server-side tap point 280 may be placed near to, in a network topology sense, to the server 206. In the illustrated embodiment, the network communication between the client 202 and the server 206 may occur in an encrypted or at least partially encrypted manner (illustrated via the closed lock graphic).

AS described above, a plurality of tapping points may, in some embodiments, be added at various points throughout the system 200. In other embodiments, there may be tunneling proxies between the client 202 and server 206 which creates additional network segmentation. It is understood that the above is merely one illustrative example to which the disclosed subject matter is not limited.

In one embodiment, the system 200 may include a server-side network tap point analyzer device 208 and a client-side network tap point analyzer device 268. In such an embodiment, the network tap point analyzer device 268 may be configured to receive a copy of the network communication 222 captured or duplicated by the network tap point 212. Likewise, network tap point analyzer device 208 may be configured to receive a copy of the network communication 220 captured or duplicated by the network tap point 280.

In various embodiments, the network tap point analyzer device 268 may not be capable of decrypting the network communication 220. Regardless, the network tap point analyzer device 268 may be configured to monitor the encrypted network communication 222 and not discard or ignore the encrypted network communication or data objects.

In this context, a "data object" includes a discrete portion of a network communication and may include a data packet, datagram, or frame, and may be measured in terms of bytes, bits, or characters. In various embodiments, the data object may include a header portion and a payload portion. In such an embodiment, the header portion may, at a minimum, indicate the immediate source and destination devices to which the data object is transmitted from/to, respectively (e.g., client device 202 and AP device 204, AP device 204 and server 206, etc.). The payload portion may include any information transmitted by the data object and may also include encapsulated routing or header information (e.g., in the case where the network communication is interrupted by or involves a proxy server, a virtual local area network information, a virtual private network information, etc.). In some embodiments, this payload portion may be encrypted. In various embodiments, network communication may include a stream or plurality of various data objects transmitting respective pieces of information between two devices (e.g., client 202 and server 206, etc.).

In various embodiments, in which the encrypted network communication is monitored, the analyzer device 268 may be configured to provide limited network performance metrics (e.g., latency, etc., as described above, etc.) based on the network portion between the tap point 212 and the server 206. In such an embodiment, the analyzer device 268 may be configured to provide limited metrics or network performance statistics.

In various embodiments, a second or server-side tap point 280 may be employed. In such an embodiment, the system 200 may include a server tap point analyzer device 208. The server tap point analyzer device 208 may be configured to monitor the encrypted network communication 220 and not discard or ignore the encrypted network communication or data objects.

Unlike the client tap point analyzer device 268, the server tap point analyzer device 208 may be more tightly integrated with or more trusted. In such an embodiment, the server 206 may provide the server tap point analyzer device 208 with the server's private keys or security credentials 295. In such an embodiment, the server tap point analyzer device 208 may, as part of monitoring the network communication 220, detect when a new encrypted network communication session is starting (e.g., the SSL negotiation phase of the SSL session, etc.), and extract (using the server key 295) the session encryption key or session security credentials 296 for each encrypted network communication session. In various embodiments, this may allow the server tap point analyzer device 208 to decrypt the monitored server-side network communication 220.

In such an embodiment, the encrypted server-side network communication 220 maybe decrypted (e.g., via a decrypter 218 portion of the tap point analyzer device 208, and indicated in the illustration by the open lock graphic). In various embodiments, a traffic monitor portion (shown in FIG. 1) of the tap point analyzer device 208 may include the decrypter 218.

In the illustrated embodiment, the analyzer 219 may be configured to provide a greater analysis and more accurate metrics than that of client tap point analyzer device 268 which is incapable of decrypting encrypted network communication. In such an embodiment, the analyzer 219 may be configured to correlate or match data objects or portions from the decrypted server-side network communication with data objects or portions from the encrypted client-side network communications. In various embodiments, various metrics may be provided based upon these matched data objects that include metrics for the client 202/server 206 network communication as a whole, as well as metrics for each side or portion (client-side, server-side) of the network communication.

As described above, the client tap point analyzer device 268 may not be capable to decrypting the encrypted monitored network communication traffic 222. In such an embodiment, the information included by the monitored network communication traffic 222 that would normally be analyzed (e.g., Uniform Resource identifiers (URIs), Uniform Resource Locators (URLs), cookies, etc.) may be unavailable for the portions of the monitored traffic 222 that are encrypted. However, the client tap point analyzer device 268 may be configured to infer HTTPS transaction or other definable portions of the encrypted monitored network communication traffic 222. In various embodiments, other information may also be inferred, such as, for example, TCP/IP level information or timing metrics, etc.

In various embodiments, the client tap point analyzer device 268 may include a monitor 278 configured to monitor or record the monitored network traffic 222. In one embodiment, the client tap point analyzer device 268 may include an Identifier (ID) Generator 279 configured to generate a substantially unique ID 297 for the inferred or partitioned portions of the monitored network traffic 222.

In various embodiments, these substantially unique ID 297s may be transmitted or sent from the client tap point analyzer device 268 to the server tap point analyzer device 208. In various embodiments, the inferred HTTPS transactions, themselves, may be transmitted or sent to the server tap point analyzer device 208.

In some embodiments, the ID Generator 279 may be configured to examine the unencrypted portions (e.g., headers, etc.) of the monitored network traffic 222. As described above, the payload portions may be encrypted and un-readable by the client tap point analyzer device 268. For each packet, data unit, data object or otherwise discrete portion of the network traffic 222, the client tap point analyzer device 268 may detect which direction (e.g., client-to-server, server-to-client, etc.) the packet is directed. In various embodiments, this may be done based upon the un-encrypted header. In one such embodiment, client-to-server direct traffic 222 may be considered an HTTP Request and server-to-client traffic 222 may be considered an HTTP Response. Further, in various embodiments, other un-encrypted information (e.g., HTTP timings, byte counts, packet counters, etc.) may be employed to group packets into inferred HTTP transactions or other definable portions of the network traffic 222.

In various embodiments, the substantially unique ID 297 for the inferred HTTPS transmission (or other definable network communications portion) may include or be based, at least partially, upon the client IP address, the client TCP port, and the TCP sequence number of the network communication request or response. It is understood that the above are merely a few illustrative examples to which the disclosed subject matter is not limited.

In such an embodiment, after receipt of the substantially unique ID 297, the server tap point analyzer device 208 may be configured to correlate or associate the substantially unique ID 297 (or the inferred portions of the traffic 222 they represent) with the decrypted portions of the network communications traffic 220. In such an embodiment, as the decrypted 218 is configured to decrypt the network communications traffic 220, the server tap point analyzer device 208 may be able to actually detect or define (as opposed to merely infer) the HTTPS transactions or otherwise defined portions of the encrypted monitored network communication traffic 220.

In various embodiments, the analyzer 219 may include an ID generator that is used or employed to generate a second set of substantially unique IDs that are based upon the decrypted network communications 221. These decrypt-based substantially unique IDs 298 may then be compared to the encryption-based substantially unique IDs 297 to correlate or associate portions or transactions within the network communications. In various embodiments, if a decrypt-based substantially unique ID 298 and an encryption-based substantially unique ID 297 match, the analyzer 219 may determine that the underlying portion of the network communications match as for a given portion of the network communications the generated ID should be substantially unique, such that if the results match they much have derived from the same source. It is understood that the above is merely one illustrative example to which the disclosed subject matter is not limited.

In various embodiments, the analyzer 219 may be configured to determine that two data objects (e.g., an ID 297 and a decrypted network traffic portion, etc.) are matched or correlated if a set of predefined criteria are met. It is understood that the below are merely a few illustrative example criteria to which the disclosed subject matter is not limited.

Do the two data objects share a common end point or destination device? If the either source or destination devices included in the header portion of the starting data object is the same as either the source or destination devices included in the header portion of the candidate data object, the two data objects are associated with the same end device (e.g., the AP device 204, client 202, server 206, etc.) and may match. In one embodiment, for example, the destination device of the starting data object and the source device of a candidate data object may both be the AP device 204. In various embodiments, this determination may be based upon the network addresses (e.g., Internet Protocol (IP) addresses, etc.) of the devices.

While it may not be possible to determine the session encryption keys or session security credentials from the network tap point 212, it may be possible to determine the hostname (e.g., www.salesforce.com, etc.) or hostnames (e.g., *. salesforce.com, etc.) that are associated with the server 206 and the corresponding session key or certificate (e.g., the SSL certificate exchanged between the client 204 and the server 206, etc.). From that point on, any data objects using that session key or certificate may be considered to be associated with the session key or certificate's hostname(s). A hostname from a decrypted data object may be checked against the hostname associated with an encrypted data object to determine if the two data objects are associated with the same hostname. Allowances may be made for the case where a plurality of hostnames (e.g., *.salesforce.com, etc.) are associated with a particular session key or SSL certificate.

Figure 3:
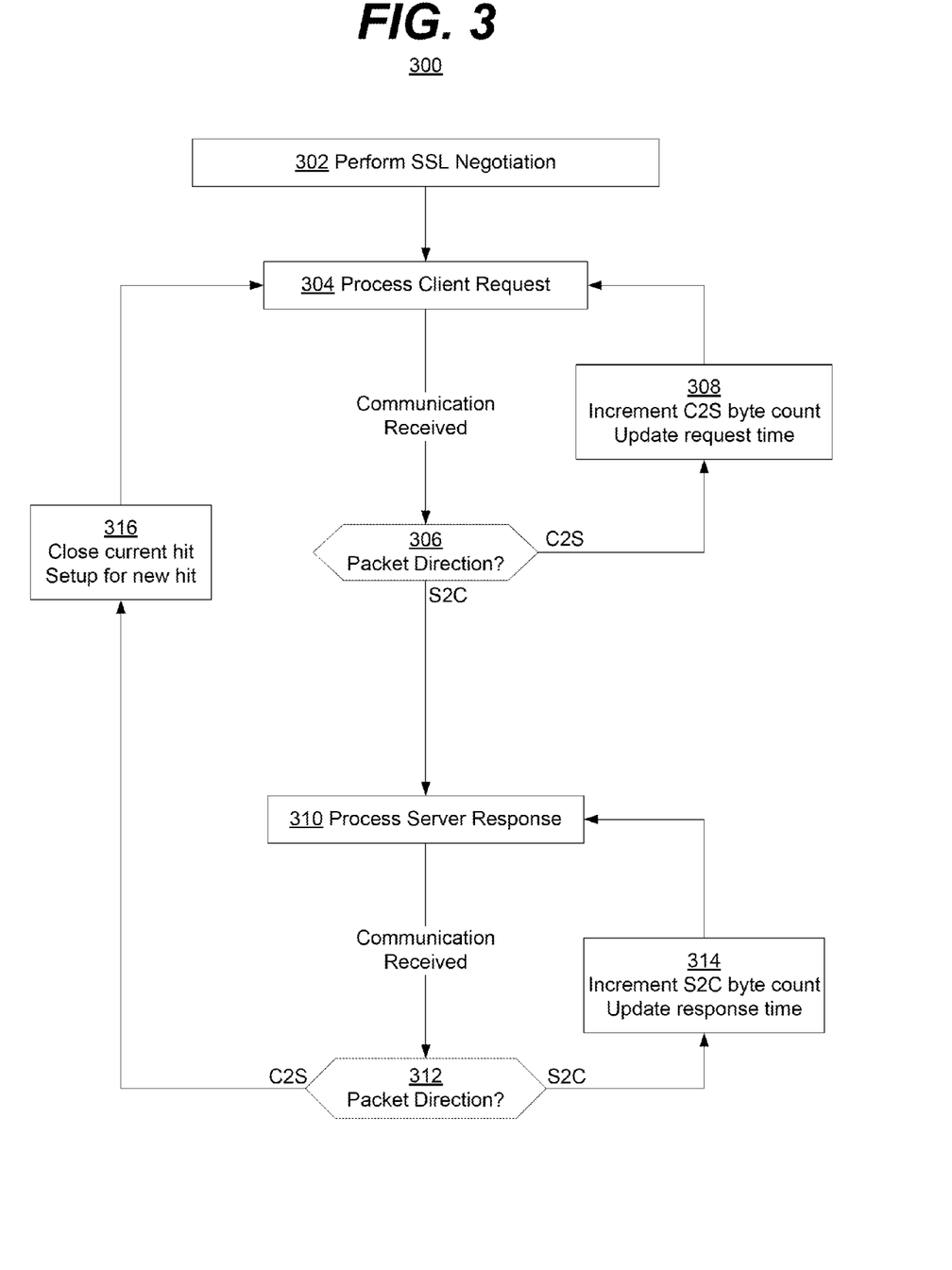
FIG. 3 is a flowchart of an example embodiment of a technique in accordance with the disclosed subject matter.

FIG. 3 is a flowchart of an example embodiment of a technique 300 in accordance with the disclosed subject matter. In various embodiments, the technique 300 may be used or produced by the systems such as those of FIGS. 1 and 2. Although, it is understood that the above are merely a few illustrative examples to which the disclosed subject matter is not limited. It is understood that the disclosed subject matter is not limited to the ordering of or number of actions illustrated by technique 300.

In various embodiments, the technique 300 may be employed to infer the HTTP transaction. In some embodiments, the technique 300 may be executed by a tap point analyzer device on the client-side.

Block 302 illustrates that, in one embodiment, an SSL negotiation (e.g., key exchange, etc.) may have occurred. In general, this SSL negotiation may occur in an unencrypted fashion. In various embodiments, when dealing with unencrypted traffic, such as, but not limited to, the SSL negotiation, the system or tap point analyzers may not need to infer HTTP transactions (as they are easily detectable in an unencrypted state). In such an embodiment, the client-side tap point analyzer may not generate a substantially unique ID, but may directly analyze information related to the transaction or generate metrics based on the unencrypted information. It is understood that the above is merely one illustrative example to which the disclosed subject matter is not limited.

Block 304 illustrates that, in one embodiment, the technique 300 may assume that encrypted communication over HTTP transaction may begin with a client request (e.g., a request for by the client a web page or information form the server, etc.). As such, a communication or data object may be received after the SSL negotiation.

Block 306 illustrates that, in one embodiment, the direction (e.g., client-to-server, server-to-client, etc.) of the packet or data object may be detected. In various embodiments, this may be based upon the destination network address (e.g., IP address, etc.) of the packet or data object. In some embodiments, the source network address (e.g., IP address, etc.) of the packet or data object may also be used or employed. In various embodiments, the network addresses may be included in the unencrypted portion (e.g., header, etc.) of the encrypted data object, as described above.

In various embodiments, the client tap point analyzer device may maintain a number of counters, metrics, scoreboards, etc. for a plurality of transactions (e.g., with a plurality of clients, with a plurality of servers, etc.). In such an embodiment, each substantially simultaneous transaction may be allocated its own set of counters, et al. In some embodiments, as it is determined that a transaction is completed, the respective counters, et al. may be freed or re-allocated to another transaction. It is understood that the above are merely a few illustrative examples to which the disclosed subject matter is not limited.

Block 308 illustrates that, in one embodiment, if the packet or data object is travelling in a client-to-server direction, the client tap point analyzer device may increment a counter that measures the byte count (or similar measure) for the current client-to-server (C2S) transaction. In various embodiments, the timestamp for the last byte of client request may be updated to the timestamp of the current packet or data object. In various embodiments, other actions may be performed.

Block 304 illustrates that, in one embodiment, the client request, up to the current packet or data object, may be processed. In various embodiments, this may include generating a respective substantially unique ID for the HTTP transaction that includes the client request. It is understood that the above is merely one illustrative example to which the disclosed subject matter is not limited.

In various embodiments, the actions of Blocks 306, 308 and 304 may re-occur until the direction of the packet has changed (e.g., client-to server changes to server-to-client, etc.). In such an embodiment, it may be inferred or determined (possibly incorrectly) that the first portion of the HTTP transaction (e.g., a client request, etc.) has ended.

In a preferred embodiment, an HTTP transaction may be considered to include two portions: a S2C portion or client request, and a S2C portion of server response. However, in various other embodiments, the HTTP transaction may only be considered to include one of those two portions, either a client request or a server response. In such an embodiment, at the end of the client request portion, Block 304 may include transmitting the substantially unique ID to the server tap point analyzer device. It is understood that the above are merely a few illustrative examples to which the disclosed subject matter is not limited.

Block 310 illustrates that, in one embodiment, once the direction of the packet or data object has been detected as server-to-client (S2C), the client tap point analyzer device may assume or infer that a HTTP transaction that includes a server response (e.g., the information requested by the client, etc.) has begun.

Block 312 illustrates that, in one embodiment, the direction (e.g., client-to-server, server-to-client, etc.) of the packet or data object may be detected similarly to the actions of Block 306.

Block 314 illustrates that, in one embodiment, if the packet or data object is travelling in a server-to-client direction, the client tap point analyzer device may increment a counter that measures the byte count (or similar measure) for the current server-to-client transaction. In various embodiments, the timestamp for the last byte of server response may be updated to the timestamp of the current packet or data object. In various embodiments, other actions may be performed.

Block 310 illustrates that, in one embodiment, the server response, up to the current packet or data object, may be processed. In various embodiments, this may include generating a respective substantially unique ID for the HTTP transaction that includes the server response. It is understood that the above is merely one illustrative example to which the disclosed subject matter is not limited.

In various embodiments, the actions of Blocks 310, 312 and 314 may re-occur until the direction of the packet has changed (e.g., client-to server changes to server-to-client, etc.). In such an embodiment, it may be inferred or determined (possibly incorrectly) that the first portion of the HTTP transaction (e.g., a client request, etc.) has ended.

Block 316 illustrates that, in one embodiment, if the packet direction changes (e.g., from server-to-client to client-to-server), it may be inferred that the server response portion of the HTTP transaction is complete. In such an embodiment, the current inferred HTTP transaction may be finalized or written to an object file. In such an embodiment, the respective counters, et al. used for the current HTTP transaction may be freed or be made available for re-allocation to a new or subsequent HTTP transaction. In various embodiments, the HTTP transaction start-timestamp may be reset to the current packet time. As described above, in various embodiments, the substantially unique ID for the inferred HTTP transaction may be generated and transmitted to the server tap point analyzer device.

Figure 4:
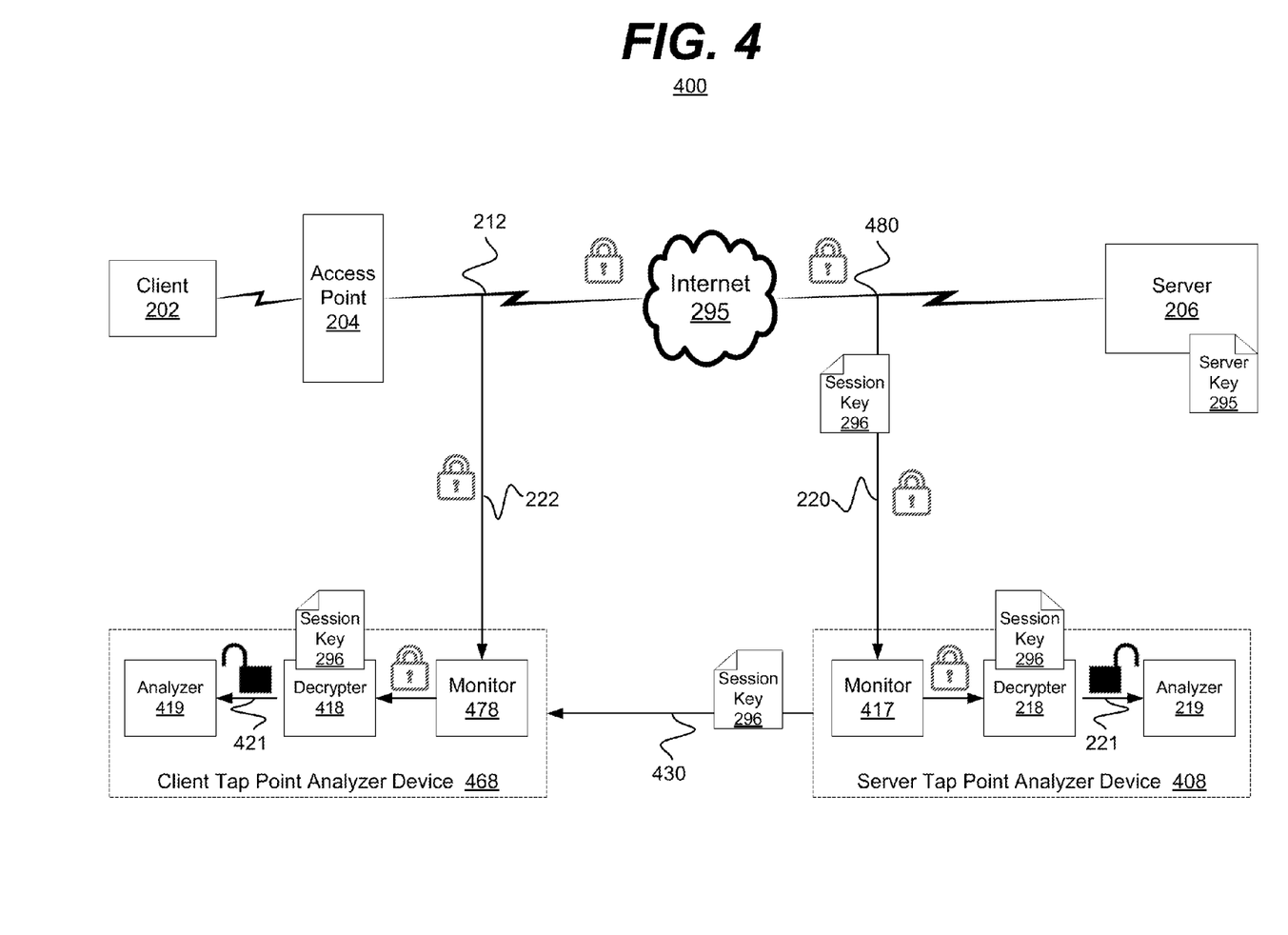
FIG. 4 is a block diagram of an example embodiment of a system in accordance with the disclosed subject matter.

FIG. 4 is a block diagram of an example embodiment of a system 400 in accordance with the disclosed subject matter. In various embodiments, the system 400 may include a client 202, a client-side AP device 204, an Internet or second network 295, and a server 206 which is accessed across or via the second network 295. In order to illustrate differences between possible embodiments the server-side AP device is not shown, but such is not required of any embodiment. It is understood that the above is merely one illustrative example to which the disclosed subject matter is not limited.

In the illustrated embodiment, the system 400 of FIG. 4 may differ from the system 200 of FIG. 2 in that the session key 296 may be extracted by the server tap point analyzer device 408 and transmitted or be made known to the client tap point analyzer device 468, as described below.

In such an embodiment, a client-side tap point 212 may be placed near to, in a network topology sense, the server-side of the AP device 204. Likewise, in the illustrated embodiment, a server-side tap point 480 may be placed near to, in a network topology sense, to the server 206. In the illustrated embodiment, the network communication between the client 202 and the server 206 may occur in an encrypted or at least partially encrypted manner (illustrated via the closed lock graphic).

As described above, a plurality of tapping points may, in some embodiments, be added at various points throughout the system 400. In other embodiments, there may be tunneling proxies between the client 202 and server 206 which creates additional network segmentation. It is understood that the above is merely one illustrative example to which the disclosed subject matter is not limited.

In one embodiment, the system 400 may include a server-side network tap point analyzer device 408 and a client-side network tap point analyzer device 468. In such an embodiment, the network tap point analyzer device 468 may be configured to receive a copy of the network communication 222 captured or duplicated by the network tap point 212. Likewise, network tap point analyzer device 408 may be configured to receive a copy of the network communication 220 captured or duplicated by the network tap point 480.

In the illustrated embodiment, the server tap point analyzer device 408 may include a Monitor 417, a decrypter 218, and an analyzer 219. In the illustrated embodiment, the monitor 417 is separated out from the decrypter 218 (as opposed to FIG. 2 that illustrated the two as combined). In one embodiment, the monitor 417 or server tap point analyzer device 408 in general may be provided with the server 206's private server key 295, as described above. In various embodiments, the monitor 417 may be configured to monitor the network communication 220. In such an embodiment, the monitor 417 may also be configured to detect and/or generate the session key 296 (e.g., during the SSL negation phase between the client 202 and the server 206, etc.). In such an embodiment, the monitor 417 may store this session key 296.

in one embodiment, the monitor 417 may provide the decrypter 218 with the session key 296. The decrypter 218 may then may use of or employ this session key 296 to decrypt the communications, generating the decrypted network communications 221, as described above. In one embodiment, the monitor 417 or the server tap point analyzer device 408 in general may be configured to also transmit or provide the client tap point analyzer device 468 with the session key (illustrated by arrow 430).

In various embodiments, this transmission 430 may occur in a substantially secure manner (e.g., via a second SSL session between the two tap point analyzer devices 408 and 468, a virtual private network (VPN), etc.). In a less preferred embodiment, the transmission may occur in a less secure manner. It is understood that the above are merely a few illustrative examples to which the disclosed subject matter is not limited.

In the illustrated embodiment, the client tap point analyzer device 468 may include a monitor 478, a decrypter 418, and an analyzer 419. In various embodiments, the monitor 478 may monitor the network communications 222, as described above. In some embodiments, the monitor 478, or the client tap point analyzer device 468 in general, may also receive the session key 296 from the server tap point analyzer device 408. In such an embodiment, the monitor 478 may forward this session key 296 to the decrypter 418. In another embodiment, the decrypter 418 may receive the session key 296 directly from the server tap point analyzer device 408. It is understood that the above are merely a few illustrative examples to which the disclosed subject matter is not limited.

In various embodiments, the decrypter 418 may be configured to use or employ the session key 296 to decrypt the monitored network communications 222, generating the decrypted network communications 421, similarly to that described above.

In such an embodiment, the decrypter 418 may be able to decrypt all the subsequent request/response pairs or client/server communications for the encryption (e.g., SSL, etc.) session associated with that particular session key 296.

In various embodiments, the system 400 may include a plurality of session keys 296, one for each SSL session (or other encrypted communications technique). In such an embodiment, these respective session keys 296 may be invalided or deleted as the corresponding SSL sessions terminate. In another embodiment, a plurality of clients 202 and/or servers 206 (not explicitly shown) may exist within system 400. In such an embodiment, the plurality of session keys 296 may exist for each client/server pair as each client/server pair would have their own corresponding SSL (or more generally encryption) sessions. In various embodiments, in which multiple client tap point analyzer devices 468 may exist (each associated with respective network segments and clients 202) the server tap point analyzer device 408 may be configured to only share or transmit session keys 296 to the client tap point analyzer device 468 associated with the same client 202 as the respective session key 296.

In one embodiment, as the client tap point analyzer device 468 may now see the decrypted network communications 421, the analyzer 419 may be configured to provide a fuller set of metrics or statistics without the need to infer network communication transactions (e.g., HTTP request/response pairs, etc.), generate substantially unique IDs, or transmit information to the server tap point analyzer device 408. Although, in various embodiments, one or more of these action may still be done.

In the illustrated embodiment, the client tap point analyzer device 468 and the server tap point analyzer device 408 may both be configured to generate their own set of metrics or statistics, as described above. In one embodiment, these two sets of metrics may be transmitted or reported to a central or common consolidation point or device (e.g., IT Device 109 of FIG. 1). In such an embodiment, a consolidated or third set of metrics may be generated based upon the two sets of metrics. It is understood that the above is merely one illustrative example to which the disclosed subject matter is not limited.

Figure 5:
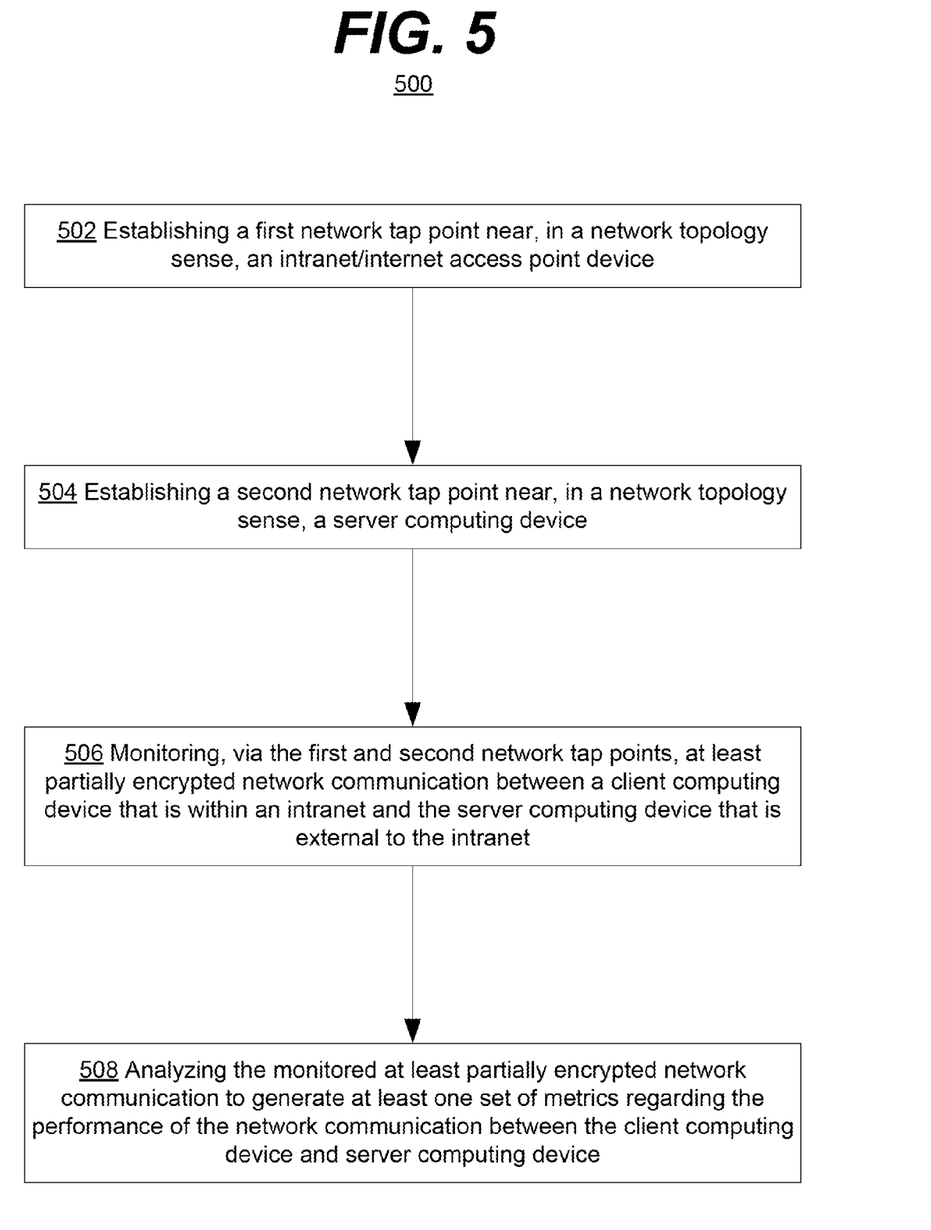
FIG. 5 is a flowchart of an example embodiment of a technique in accordance with the disclosed subject matter.

FIG. 5 is a flow chart of an example embodiment of a technique in accordance with the disclosed subject matter. In various embodiments, the technique 500 may be used or produced by the systems such as those of FIG. 1, 2, or 4. Furthermore, portions of technique 500 may be used or produced by a technique such as that of FIG. 3. Although, it is understood that the above are merely a few illustrative examples to which the disclosed subject matter is not limited. It is understood that the disclosed subject matter is not limited to the ordering of or number of actions illustrated by technique 500.

Block 502 illustrates that, in one embodiment, a first network tap point may he established near, in a network topology sense, an intranet/internet access point device, as described above. In various embodiments, the first network tap point may provide a substantially non-intrusive means of viewing network communication through the intranet/internet access point, as described above. In some embodiments, the at least partially encrypted network communication may include at least one network communications transaction, as described above. In various embodiments, one or more of the action(s) illustrated by this Block may be performed by the apparatuses or systems of FIG. 1, 2, or 4, the client-side tap points of FIG. 1, 2, or 4, as described above.

Block 504 illustrates that, in one embodiment, a second network tap point may be established near, in a network topology sense, a server computing device, as described above. In various embodiments, the second network tap point may provide a substantially non-intrusive means of viewing network communication received or transmitted by the server computing device, as described above. In some embodiments, the at least partially encrypted network communication may include at least one network communications transaction, as described above. In one embodiment, establishing may include providing an associated network tap point analyzing device with at least one encryption credential of the server device, as described above. In various embodiments, one or more of the action(s) illustrated by this Block may be performed by the apparatuses or systems of FIG. 1, 2, or 4, the server-side tap points of FIG. 1, 2, or 4, as described above.

Block 506 illustrates that, in one embodiment, at least partially encrypted network communication between a client computing device and the server computing device may be monitored, as described above. In one embodiment, the first tap point analyzer device may monitor the at least partially encrypted network communication from a first point of view (e.g., the access point's point of view, etc.), as described above. In one embodiment, the second tap point analyzer device may monitor the at least partially encrypted network communication from a second point of view (e.g., the server's point of view), as described above. In some embodiments, the second network tap point may be configured to decrypt at least a portion of the at least partially encrypted network communication, as described above.

In one embodiment, monitoring may include transmitting at least a portion of the monitored at least partially encrypted network communication from a first network tap point analyzer device associated with the first network tap point to a second network tap point analyzer device associated with the second network tap point, as described above. In such an embodiment, transmitting may include generating, by a first network tap point analyzer device, a substantially unique identifier for a portion of the monitored at least partially encrypted network communication that is monitored by the first network tap point, as described above. In some embodiments, transmitting may include transmitting the substantially unique identifier to the second network tap point analyzer device, as described above.

In various embodiments, monitoring may include inferring, by a first network tap point analyzer device, a network communications transaction based upon a portion of the monitored at least partially encrypted network communication, as described above. In such an embodiment, monitoring may also include generating an identifier for the inferred network communication transaction, as described above. In some embodiments, monitoring may include transmitting the identifier of the inferred network communication transaction to a second network tap point analyzer device, as described above.

In one embodiment, monitoring may include generating, by a first network tap point analyzer device, a substantially unique identifier for a portion of the monitored at least partially encrypted network communication that is monitored by the first network tap point, as described above. In such an embodiment, the substantially unique identifier may be based upon, at least in part, a client network address and one or more sequence numbers associated with the portion of the monitored at least partially encrypted network communication, as described above.

In various embodiments, monitoring may include determining a direction of a plurality of portions of the monitored network communication, as described above. In such an embodiment, monitoring may also include detecting a network communications transaction based, at least in part, upon the detected directions of a plurality of portions of the monitored network communication, as described above.

In one embodiment, monitoring may include detecting, by a second network tap point analyzer device associated with the second network tap point, an encryption session key associated with at least a portion of the at least partially encrypted network communication, as described above. In such an embodiment, monitoring may also include transmitting the encryption session key to a first network tap point analyzer device associated with the first network tap point, as described above.

In some embodiments, monitoring may further include decrypting, by employing an encryption session key, at least a portion of the at least partially encrypted network communication viewing via the first tap point to generate a first decrypted network communication, as described above. In various embodiments, monitoring may also include decrypting, by employing the encryption session key, at least a portion of the at least partially encrypted network communication viewing via the second tap point to generate a second decrypted network communication, as described above.

In yet another embodiment, monitoring may include receiving, by a first network tap point analyzer device associated with the first network tap point and from a second network tap point analyzer device associated with the second network tap point, an encryption session key associated with at least a portion of the at least partially encrypted network communication, as described above. In such an embodiment, monitoring may further include decrypting, by employing the encryption session key, at least a portion of the at least partially encrypted network communication viewing via the first tap point, as described above.

It is understood that the above are merely a few illustrative examples to which the disclosed subject matter is not limited. In various embodiments, one or more of the action(s) illustrated by this Block may be performed by the apparatuses or systems of FIG. 1, 2, or 4, the tap point analyzer devices of FIG. 1, 2, or 4, as described above.

Block 508 illustrates that, in one embodiment, the monitored at least partially encrypted network communication may be analyzed to generate at least one set of metrics regarding the performance of the network communication between the client computing device and server computing device, as described above. In one embodiment, analyzing May include generating a first set of metrics for monitored network communications transmitted from the server computing device to the client computing device, as described above. In such an embodiment, analyzing may include generating a second set of metrics for monitored network communications transmitted from the client computing device to the server computing device, as described above.

In some embodiments, analyzing may include decrypting a portion of the monitored, by a second network tap point, at least partially encrypted network communication to create a decrypted network communications transaction, as described above. In such an embodiment, analyzing may also include associating the identifier for the inferred network communication transaction with the decrypted network communications transaction, as described above. In such embodiments, analyzing may further include matching an identifier with a candidate decrypted network communications transaction based, at least in part, upon a byte count of the inferred network communication transaction and a byte count of the decrypted network communications transaction, as described above.

In one embodiment, analyzing may include generating, by the first tap point analyzer device, a first set of metrics based upon the first decrypted network communication, as described above. In such an embodiment, analyzing may also include generating, by the second tap point analyzer device, a second set of metrics based upon the second decrypted network communication, as described above. In some embodiments, analyzing may also include generating a third set of metrics based upon the first and second sets of metrics, as described above.

It is understood that the above are merely a few illustrative examples to which the disclosed subject matter is not limited. In various embodiments, one or more of the action(s) illustrated by this Block may be performed by the apparatuses or systems of FIG. 1, 2, or 4, the tap point analyzer devices of FIG. 1, 2, or 4, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
    establishing a first network tap point near, in a network topology sense, an intranet/internet access point device, wherein the first network tap point provides a substantially non-intrusive means of viewing network communication through the intranet/internet access point;
    establishing a second network tap point near, in a network topology sense, a server computing device, wherein the second network tap point provides a substantially non-intrusive means of viewing network communication received or transmitted by the server computing device;
    monitoring, via the first and second network tap points, at least partially encrypted network communication between a client computing device that is within an intranet and the server computing device that is external to the intranet, the monitoring including inferring, by a first network tap point analyzer device, a network communication transaction based on a first portion of the monitored at least partially encrypted network communication that is viewed by the first network tap point analyzer device, generating an identifier for the inferred network communication transaction, and transmitting the identifier of the inferred network communication transaction to a second network tap point analyzer device;
    decrypting a second portion of the at least partially encrypted network communication that is viewed by the second tap point analyzer device to derive a decrypted network communication transaction; and
    analyzing the inferred network communication transaction and the decrypted network communication transaction to generate at least one set of metrics regarding the performance of the at least partially encrypted network communication between the client computing device and the server computing device,
    wherein the analyzing includes comparing and matching the identifier of the inferred network communication with an identifier of the decrypted network communication.

2. The method of claim 1, wherein the monitoring includes:
    transmitting the first portion of the monitored at least partially encrypted network communication from the first network tap point analyzer device associated with the first network tap point to the second network tap point analyzer device associated with the second network tap point.

3. The method of claim 1, wherein the identifier for the inferred network communication transaction includes a substantially unique identifier.

4. The method of claim 1, wherein the analyzing includes:
    associating the identifier for the inferred network communication transaction with the decrypted network communication transaction.

5. The method of claim 4, wherein the associating the identifier for the inferred network communication transaction with the decrypted network communication transaction includes:
 matching the identifier with the decrypted network communication transaction based, at least in part, upon a byte count of the inferred network communication transaction and a byte count of the decrypted network communication transaction.

6. The method of claim 1, wherein the establishing a second network tap point includes providing the second network tap point analyzing device with at least one encryption credential of the server computing device.

7. The method of claim 1, wherein the generating an identifier for the inferred network communication transaction includes:
 generating the identifier based upon, at least in part, a client network address and one or more sequence numbers associated with the first portion of the monitored at least partially encrypted network communication.

8. The method of claim 1, wherein the monitoring includes:
 determining a direction of the first and second portions of the monitored at least partially encrypted network communication; and
 wherein the analyzing includes:
 generating a first set of metrics for the first portion of the monitored at least partially encrypted network communication, the first portion relating to communication transmitted from client computing device to the server computing device, and
 generating a second set of metrics for the second portion of the monitored at least partially encrypted network communication, the second portion relating to communication transmitted from the server computing device to the client computing device.

9. The method of claim 1, wherein the monitoring includes:
 detecting, by the second network tap point analyzer device associated with the second network tap point, an encryption session key associated with the at least partially encrypted network communication, and
 transmitting the encryption session key to the first network tap point analyzer device associated with the first network tap point.

10. The method of claim 9, further comprising:
 decrypting, by employing the encryption session key, the first portion of the at least partially encrypted network communication to generate a secondary decrypted network communication; and
 wherein the analyzing includes:
 generating, by the first tap point analyzer device, a first set of metrics based upon the secondary decrypted network communication,
 generating, by the second tap point analyzer device, a second set of metrics based upon the decrypted network communication, and
 generating a third set of metrics based upon the first and second sets of metrics.

11. The method of claim 1, further comprising:
 receiving, by the first network tap point analyzer device associated with the first network tap point and from the second network tap point analyzer device associated with the second network tap point, an encryption session key associated with the at least partially encrypted network communication, and
 decrypting, by employing the encryption session key, the first portion of the at least partially encrypted network communication.

12. A system comprising:
 a first network tap point configured to duplicate, in a non-intrusive manner, at least part of a network communication transmitted to and from an access point device that forms the boundary between a first network and a second network;
 a second network tap point configured to duplicate, in a non-intrusive manner, at least part of a network communication transmitted to and from a server computing device placed within, in a network topology sense, the second network;
 a client-side tap point analyzer device configured to:
 monitor, via the first network tap point, at least partially encrypted network communication between a client computing device that is within the first network and the server computing device,
 infer a network communication transaction based upon a first portion of the monitored at least partially encrypted network communication,
 generate an identifier for the inferred network communication transaction, and
 transmit the identifier of the inferred network communication transaction to a server-side tap point analyzer device; and
 the server-side tap point analyzer device configured to:
 monitor, via the second network tap point, the at least partially encrypted network communication between the client computing device and the server computing device,
 decrypt a second portion of the monitored at least partially encrypted network communication to derive a decrypted network communication transaction, and
 analyze the inferred network communication transaction and the decrypted network communication transaction to generate at least one set of metrics regarding the performance of the at least partially encrypted network communication between the client computing device and server computing device including compare and match the identifier of the inferred network communication with an identifier of the decrypted network communication.

13. The system of claim 12, wherein the identifier for the inferred network communication transaction includes a substantially unique identifier.

14. The system of claim 12 wherein the server-side tap point analyzer device is configured to:
 associate the identifier for the inferred network communication transaction with the decrypted network communication transaction.

15. The system of claim 12 wherein the server-side tap point analyzer device is configured to:
 match the identifier of the inferred network communication transaction with the decrypted network communication transaction based, at least in part, upon a byte count of the inferred network communication transaction and a byte count of the decrypted network communication transaction.

16. The system of claim 12, wherein the client-side tap point analyzer device is configured to:
 generate the identifier of the inferred network communication transaction based upon, at least in part, a client network address and one or more sequence numbers associated with the first portion of the monitored at least partially encrypted network communication.

17. A computer program product for managing a network, the computer program product being tangibly embodied on a non-transitory computer-readable medium and including executable code that, when executed, is configured to cause at least one processor to:
- monitor, via a first network tap point and a second network tap point, at least partially encrypted network communication between a client computing device that is within a first network and a server computing device that is within a second network;
- infer a network transaction from a first portion of the at least partially encrypted network communication viewed by the first network tap point;
- generate an identifier for the inferred network transaction;
- decrypt a second portion of the at least partially encrypted network communication viewed by the second network tap point to derive a decrypted network transaction using an encryption key associated with the server computing device;
- correlate the inferred network transaction with the decrypted network transaction based on the identifier for the inferred network transaction; and
- analyze the decrypted network transaction correlated with the inferred network transaction to generate at least one set of metrics regarding the performance of the at least partially encrypted network communication between the client computing device and server computing device including compare and match the identifier of the inferred network communication with an identifier of the decrypted network communication.

18. The computer program product of claim 17, wherein the executable code to correlate the inferred network transaction with the decrypted network transaction, when executed, cause the at least one processor to:
- match the identifier of the inferred network communication with the decrypted network communication transaction based, at least in part, upon a byte count of the inferred network communication transaction and a byte count of the decrypted network communication transaction.

* * * * *